United States Patent [19]
Hamazawa

[11] Patent Number: 5,455,468
[45] Date of Patent: Oct. 3, 1995

[54] SWITCHING CIRCUIT FOR SWITCHING A PLURALITY OF LINES

[75] Inventor: Yoshinori Hamazawa, Daito, Japan

[73] Assignee: Funai Electric Co., Ltd., Daito, Japan

[21] Appl. No.: 996,704

[22] Filed: Dec. 24, 1992

[30]     Foreign Application Priority Data

Dec. 24, 1991 [JP] Japan .................................. 3-341043

[51] Int. Cl.⁶ ..................................................... H04J 1/16
[52] U.S. Cl. ........................... 307/112; 379/422; 379/423
[58] Field of Search ........................... 200/224; 307/112, 307/125; 379/422, 423, 421, 387, 82, 61; 340/825.04, 825.2, 825.36

[56]              References Cited
              U.S. PATENT DOCUMENTS 5,264,841  11/1993  Wagai et al. ........................ 340/825.44

FOREIGN PATENT DOCUMENTS 1231539  9/1989  Japan .............................. H04L 11/00

*Primary Examiner*—Steven L. Stephan
*Assistant Examiner*—Aditya Krishnan
*Attorney, Agent, or Firm*—Lackenbach Siegel Marzullo Aronson & Greenspan

[57]              ABSTRACT

This invention enables the number of required ports on a CPU to be reduced, in a switching circuit detecting any exchanged contact point out of plural points having more than three points. In a switching circuit enabling one line to connect to any one of plural lines having more than 3 lines, one line is connected to an input port of the CPU, and one of the plural lines to be switched is connected to a referencing voltage source, and another line of said plural lines to be switched is grounded, and the remaining lines of the plural lines to be switched are connected to output ports of the CPU, and furthermore, the output ports are designed to generate referencing voltages having specified generating timings differing from the timing of data sampling signals transferred to the input port.

5 Claims, 5 Drawing Sheets

FIG. I

```
HHHHHHHHHHHH
HLHLHLHLHLHL
LLLLLLLLLLLL
```

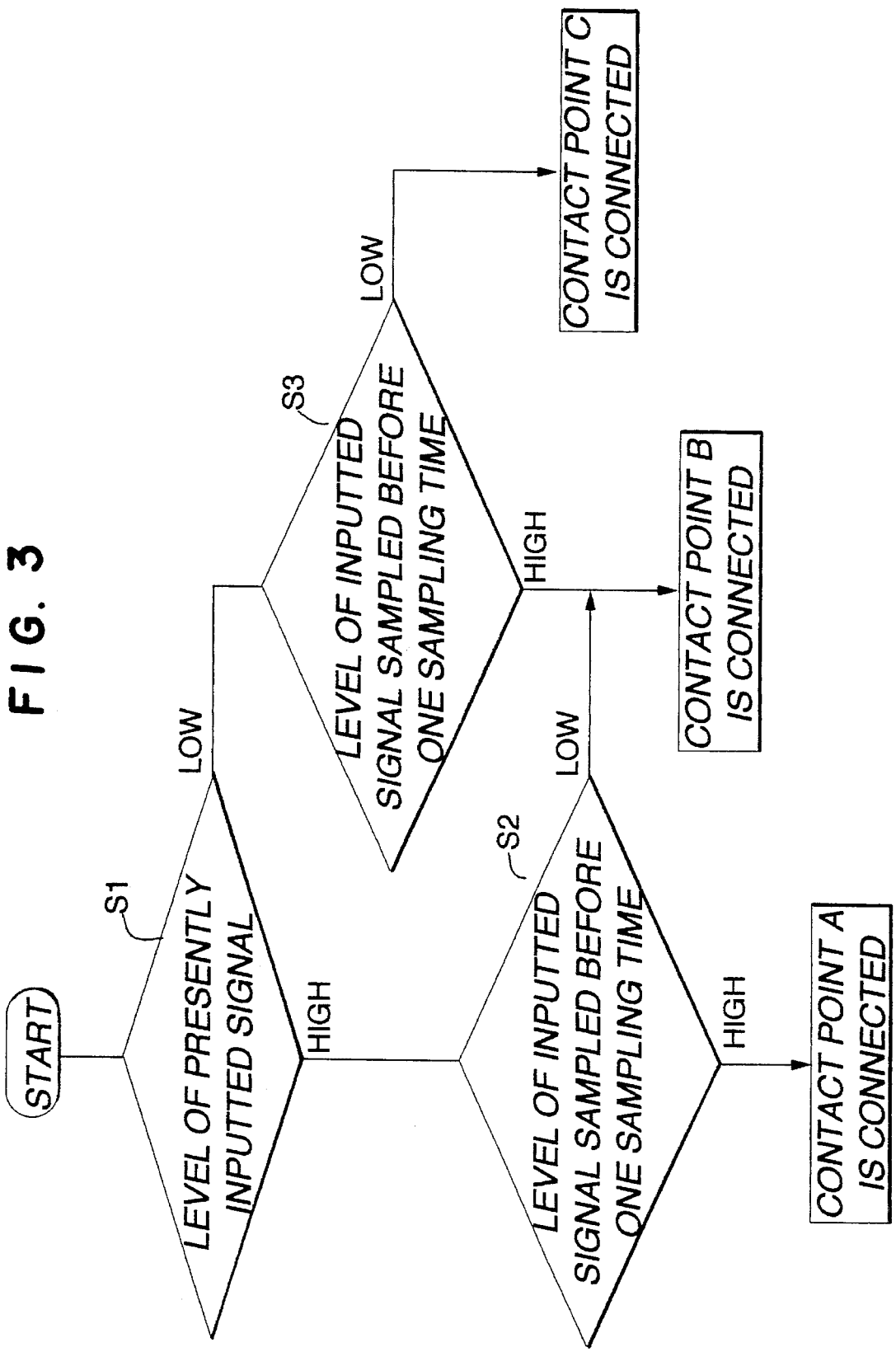

SWITCHING CIRCUIT FOR SWITCHING A PLURALITY OF LINES

BACKGROUND OF THE INVENTION

This invention relates to a switching circuit able to switch a line at least to any one of plural lines (more than three), in an electronic circuit applied to electronic and electric apparatuses or the like.

There are electronic apparatuses (for example, a telephone set) equipped with a microcomputer, having a sliding switch having 3 or more positions.

For example, in an answering telephone set having three functional modes, by selecting the mode thereof, it is possible to select a preferred mode by sliding the sliding switch by hand to the appropriate position.

The position information from this slide switch is input in the microcomputer, and the microcomputer continually exchanges the telephone mode in accordance with that information.

Accordingly, in order to let the microcomputer confirm which position is at present the position of the sliding switch, the microcomputer and the slide switch should be electronically connected. Up to the present, the following conventional circuits have been used.

As shown in FIG. 7, one line 1, connected to one end of a switching element (SW) the contact points of which are exchangeable by shifting the sliding switch, is connected to the output port of a CPU 2 of the microcomputer, and each contact point A and B located on the other end of the switching element SW are connected to the input port Pin 1 and Pin 2 of the CPU 2, and the last contact point C is left unconnected.

As said output port P out 1 discharges the pulsating scanning signal alternatively generating HIGH and LOW signals at specified times, if the signal is input in the input port Pin 1, the switch being already switched to the contact point B, and if the signal is input in the input port Pin 2, the switch is already switched to the contact point A. And if the input port Pin 1 and port Pin 2 have no signals, the switch is already switched to the contact point C.

As described above, when necessitating three contact points, at least, three input or output ports are required on the CPU 2. Similarly, when installing 2 pairs of switching elements, as shown in FIG. 8, two output ports (Pin 1 and Pin 2) transferring said scanning signals, and two input ports (Pin 1 and Pin 2), for a total of four ports, are required on the CPU 2. In this case, the reason for dividing the output port into two ports (Pin 1 and Pin 2) is to identify whether the signal input in said ports (Pin 1 and Pin 2) come from switching element SW1 or SW2, by shifting the pulse timing output from each port.

As described above, in the conventional circuit requiring an exchanging switch having more than three contact points, the required number of ports on a CPU 2 is increased, e.g., three ports for one switching element, 4 ports for a pair of switching elements, etc.

As a result, in accordance with the increase in contact points, the ports provided on the CPU 2 become fully occupied, and the wiring distribution on the circuit board becomes too complex.

Furthermore, as shown in FIG. 8, with the increase of the switching element SW to more than two sets, more than two lines receiving the scanning signals are also required, and the noise generated from the signal lines tend to increase and to exert harmful influences on the electronic circuits except for the switching circuit.

This invention was invented to solve the above-mentioned cumbersome defects.

SUMMARY OF THE INVENTION

According to the invention, this switching circuit enables one line to switch to any one of a plurality of lines (more than three lines) is constructed as follows.

One line is connected to an input port of a CPU, and one of the plural lines to be switched is connected to the referencing power source, and another line of the plural lines to be switched is grounded, and the last line of the plural lines to be switched is connected to an output port of the CPU; furthermore, this output port is designed to generate referencing power voltage having timing different from the data sampling timing of the input port.

Also, in this circuit, it may be possible to connect the remaining plural lines to be switched to the different output ports of the CPU and to differentiate the timing of the referencing voltage generation from each other for every output port.

BRIEF DESCRIPTION OF THE DRAWINGS

FIG. 1 is a circuit diagram showing an embodiment of the switching circuit in accordance to the invention.

FIG. 3 is a measurement flow chart in the CPU.

DETAILED DESCRIPTION OF THE INVENTION

The embodiment of this invention is described in detail with reference to the drawings.

FIG. 1 to FIG. 4 relate to a sliding switch SW for exchanging three positions of an answering telephone set, where by switching the sliding switch, it is possible to select any preferred mode out of the three telephone modes.

Figure 4:
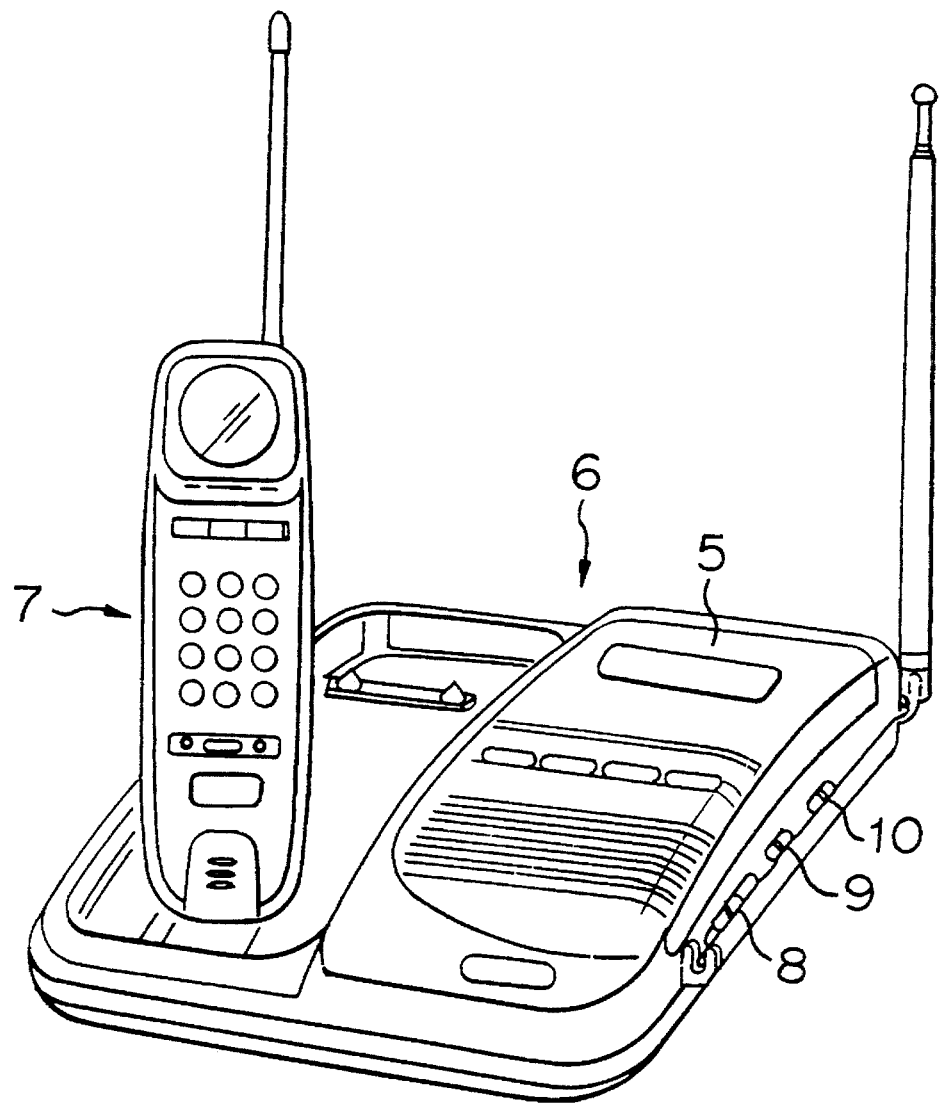
FIG. 4 is a perspective view of a telephone having the sliding switch.

FIG. 4 shows a perspective view of said telephone set equipped with the sliding switch.

This answering telephone set is modified as a cordless telephone set, and constructed with an internal main set 6 having a small-sized cassette tape recorder (not shown) for recording telephone messages while absent, and a freely portable set (hand set) 7. On the side face of the main set 6, sliding switches 8, 9 and 10 are installed, wherein, respectively, the switch 8 is for setting the ring volume, the switch 9 is for setting the number of rings desired before the actuating of the telephone into the answering mode, and the switch 10 is for setting up to record the arrival time of any telephone message.

Also, the latter two switches 9 and 10 are constructed with the switching circuits of this invention. In other words, the switches 9 and 10 are made as sliding switches which can select three positions. For example, the switch 9 is designed to ring two times in the first position, and four times in the second position.

As shown in FIG. 1, the numeral 3 identifies the central processing unit (CPU) or a microcomputer controlling the telephone set, and the other end of the line 4 connected to one end of said switching element SW is connected to an input port Pin 1 of the CPU3, and contact points A, B and C located on the other end of said switching element SW are connected as follows.

The contact point A is connected to a common referencing power source, VDD contact point B is connected to an output port Pout of the CPU3, and the contact point C is grounded.

Figure 2A:
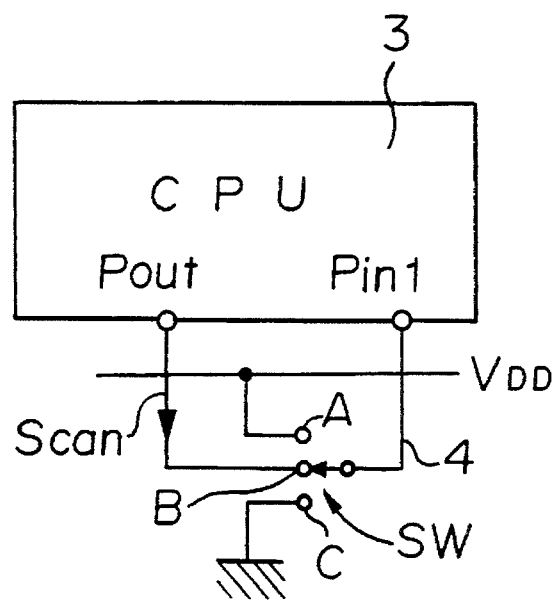
FIGS. 2(a)–2(c) are signal diagrams of the various input and output ports of the switching circuit shown in FIG. 1.
Figure 2B:
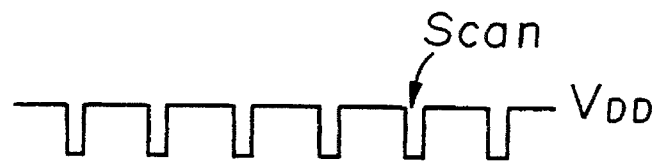

Furthermore, as shown diagrammatically in FIG. 2(b), the timing of a data-sampling signal transmitted in the input port Pin 1 is, in practice, designed to be at very short intervals, and a scanning signal Scan, output from the output port Pout has a LOW level signal after every two data-sample timings, as shown in FIG. 2(a). The voltage level of the scanning signal Scan at a HIGH level is specified to be the same as the referencing power source VDD.

Figure 2C:

Accordingly, as shown in FIG. 2(c), the signal level of the contact point A is always held at a HIGH level, and the signal level of the contact point C is always kept at a LOW level, and the contact point B alternatively receives HIGH and LOW signals. If the CPU3 recognizes these kinds of signals in the input port Pin 1, it is possible to identify in which position the switching element SW is placed.

In accordance with differently appearing input signals in the input port Pin 1, the CPU 3 searches the exchange position of the switching elements by driving programs stored in the CPU3.

The flow chart specifying the above-mentioned process is described in detail with reference to FIG. 3.

As shown in FIG. 3, at first, present input signal level in said input port Pin 1 is measured in Step S1. If the level is HIGH, the input level sampled before the one sampling time is checked in Step S2. And if it remains at a HIGH level, then it is confirmed that the present position of the switch is the contact point A.

In Step 2, if the level is measured at a LOW level, it is confirmed that it is connected to the contact point B.

Also, if at a LOW level in Step S1, the input level sampled before 1 sampling time is checked in Step 3, and if the level is HIGH, the switch is then confirmed as connected to the contact point B. If the level is LOW in Step S3, the switch is confirmed as connected to the contact point C.

Of course, each input level sampled before the one sampling time is stored in the memories or registers of the CPU3.

Figure 5:
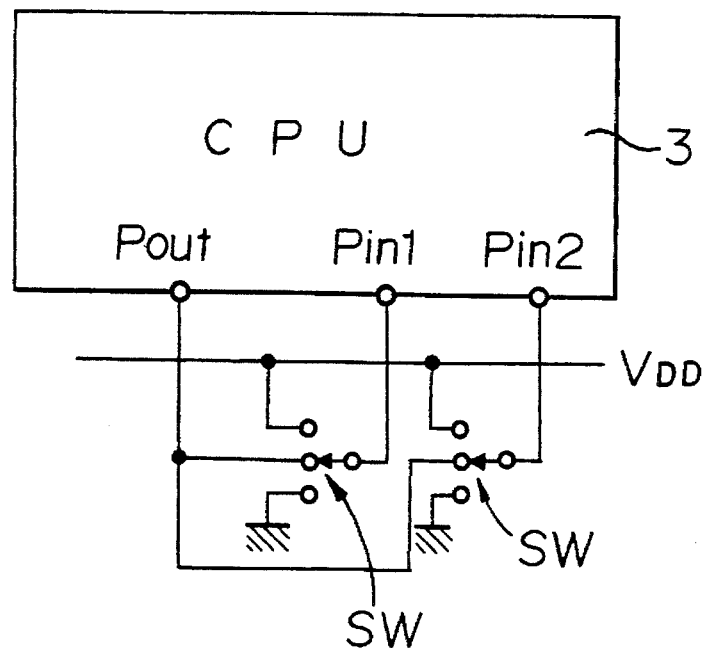
FIG. 5 is a further embodiment of a switching circuit having two switching elements.

In above-described embodiment, the switching element was composed of 1 set, but when 2 sets of switching elements are provided, the circuit shall be constructed as shown in FIG. 5.

Figure 8:
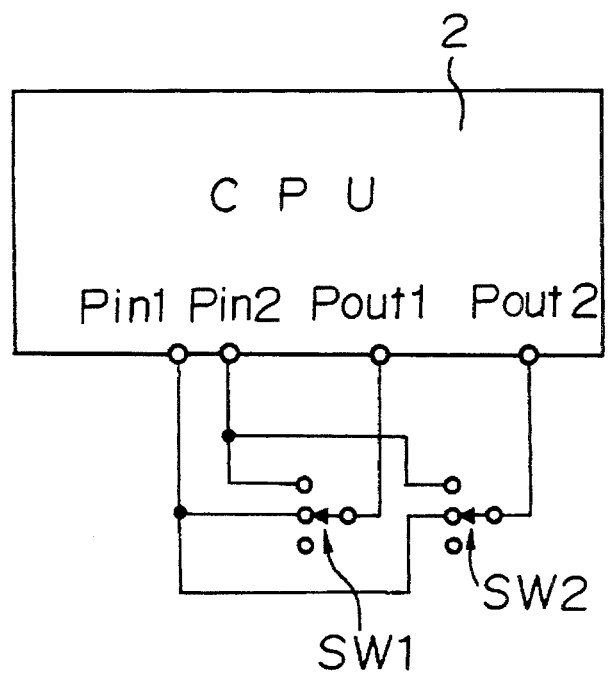
FIG. 8 is a circuit diagram of a conventional switching circuit having 2 switching elements.

As shown in FIG. 1 and FIG. 5, in spite of an increase in the number of switch elements, the output port Pout is able to cope with only one point, and it is clear that the noise sources in this case are reduced, as compared to when the different scanning signals are output towards plural lines as shown in FIG. 8.

By applying this invention, despite increasing the number of the switching elements SW, when the required number of switching elements SW is (n), the number of ports required is only (n+1).

Figure 6:
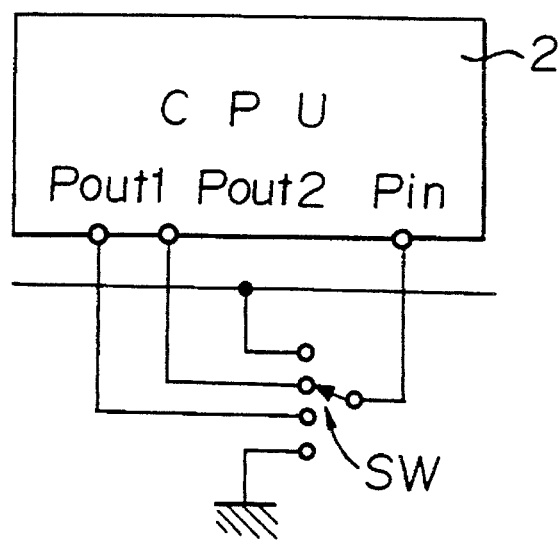
FIG. 6 is a further embodiment of a switching circuit having 4 contacting points.
Figure 7:
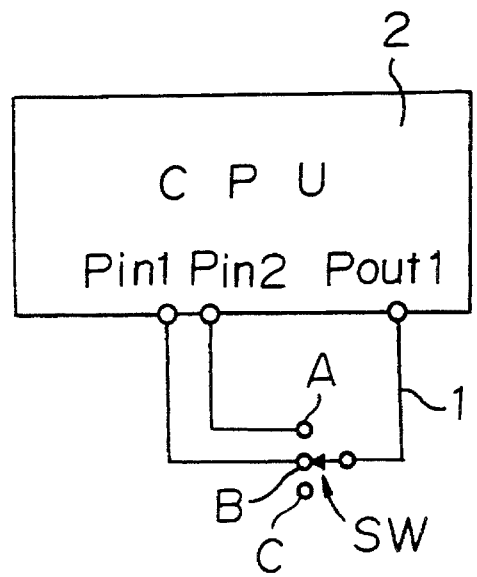
FIG. 7 is a circuit diagram of a conventional switching circuit having one switching element.

Also, when the number of contact points in each switching element increases over 4 points, it is possible to cope with the circuit as shown in FIG. 6. In this case, it is necessary to increase the number of output ports, but more input ports Pin 1 are not required. Further, in this case, it is as a matter of course to define each of the signals outputting from each output port Pout 1 and Pout 2 as a signal having a different frequency, in order to allow the CPU to recognize the difference between the signals.

As a result, as described above, in a switching circuit applying this invention, it is possible to securely reduce the number of usable ports of a CPU and, furthermore, to reduce the number of lines carrying scanning signals, and to reduce harmful influences on other electronic devices.

What is claimed is:

1. A switching circuit for switching selectively to one of three switching positions, comprising a CPU having "m" input ports and one output port; "R" single pole three position switches having one switchable terminal and three fixed terminals, one input line being connected between each CPU input port and a switchable terminal of an associated switch, an output line connecting one fixed terminal of each switch to an output port, a second one of said fixed terminal of each switch being connected to a first reference voltage source, and a third one of said fixed terminals of each switch being connected to a second reference voltage source, said CPU including means for generating a referencing voltage at the output port having a timing different from data sampling timing produced on said input ports of said CPU, the total number of ports (m+1) required of said CPU being equal to (R+1).

2. A switching circuit as defined in claim 1, wherein m=1.

3. A switching circuit as defined in claim 1, wherein m=2.

4. A switching circuit for selectively switching to one of at least four switching positions comprising a CPU having "m" input ports and a "n" output ports; "R" single pole switches each having one switchable terminal and "S" fixed terminals, one input line being connected between each CPU input port and the switchable terminal of another one of said "m" input ports, "n" output lines connecting "n" fixed terminals of each switch to said "n" output ports of said CPU, a (n+1)th one of said fixed terminals of each switch being connected to a first reference voltage source, and a (n+2)th one of said fixed terminals of each switch being connected to a second reference voltage source, said CPU including means for generating referencing voltages for output ports having timings different from data sampling timings produced on said CPU input ports, the number of input ports "m" being equal to the number of required switches and the total number of ports (m+n) required of said CPU is equal to [R+(S−2)].

5. A switching circuit as defined in claim 4, wherein "m"=1 and "n"=2.

* * * * *